3,539,434
**NONWOVEN COMPOSITIONS HAVING
IMPROVED AGING PROPERTIES**
David C. Spaulding, Cuyahoga Falls, Ohio, assignor to
The B. F. Goodrich Company, New York, N.Y., a corporation of New York
No Drawing. Filed Dec. 27, 1967, Ser. No. 693,736
Int. Cl. B32b 27/04, 29/02
U.S. Cl. 161—82                                                    7 Claims

ABSTRACT OF THE DISCLOSURE

Nonwoven materials and particularly papers treated with acrylate polymer latices are shown to have improved resistance to aging when protected with an antioxidant and chelating agent in combination. Papers saturated with acrylate polymer latices containing the antioxidant and chelating agent in combination retain a high level of physical properties even after prolonged exposure to aging and treatment with typical dry cleaning solvents.

BACKGROUND OF THE INVENTION

Disposable garments are currently attracting a great deal of attention throughout the paper industry. Recognizing the unlimited possibilities of disposable garments, apparel makers in conjunction with paper manufacturers are now directing their efforts to the production of moderately priced casual wearing apparel, such as ladies paper shift dresses, baby clothes, mens and womens swim wear, all of which might appeal to the curious buyer interested in trying something different, and also functional clothing supplies, such as aprons, surgical gowns, laboratory and hospital jackets, where the disposability of the garment solves a critical laundry problem.

As the industry becomes more knowledgeable in the manufacture of such articles and designers become more sophisticated in their creations, the emphasis will shift, at least in certain areas such as womens wear, away from the economic and functional advantages of disposable garments and more toward styling considerations. This shift will create a demand for garments able to withstand repeated wearings with no appreciable change in the appearance of the garment or in the physical properties of the material. It is even conceivable that the more expensive creations would require cleaning when the dress became soiled.

Nonwoven materials typically employed to make disposable garments consist of one or more layers of cellulosic fiber bonded together on a supporting fabric consisting of a loosely woven nylon or rayon panel called the scrim. The binding agent employed plays an important role in the make-up of the nonwoven material and largely determines the ultimate physical properties of the nonwoven including the hand of the fabric.

Acrylic polymers have been widely accepted as excellent binders for nonwoven materials such as those employed for disposable garments. The acrylic polymer binders are especially attractive because a large number of polymers and copolymers having a wide range of physical properties and all having a certain inherent resistance to light and atmospheric conditions are available and suitable for a wide variety of applications. Also, the acrylic polymers are readily obtained in latex form by emulsion polymerization of the acrylic monomers, and polymer latices are especially advantageous for application to the nonwoven as a means for impregnating the nonwoven substrate with the polymeric binder.

Papers saturated with acrylic polymers are not, comparatively speaking, so extensively degraded by exposure to the atmosphere and light or heat as papers with other polymers, such as those obtained by the polymerization of butadiene alone or interpolymerized with styrene and acrylonitrile, nevertheless, some degradation will occur and is reflected by a noticeable decrease in the physical properties of the nonwoven, especially tensile strength, elongation and tear strength. A marked loss in resistance to the action of dry cleaning solvents is also noted. Garments prepared from acrylate-bonded nonwoven fabric suffer irreparable loss in properties after aging and dry cleaning, and in this respect cannot compete favorably with those obtained from conventional woven fabrics. It would, therefore, be very advantageous to be able to increase the age-resistance and solvent-resistance of the acrylate-based nonwovens, since this would in turn extend the service life of articles manufactured from these nonwoven materials.

Also, in other areas, such as the manufacture of paper used for outdoor advertising signs, acrylate polymers are used to bind clay and other materials to the paper to give improved printability. Such papers, although not faced with the dry cleaning problem as papers used for disposable garments, are exposed to the elements and must be able to withstand this outdoor exposure with a minimum of degradation of the acrylate polymer binder, since degradation of the acrylate polymer results in a decrease in the binding strength, thus permitting the paper to become brittle and the coating and printing pigment to separate from the paper, so that the effective life of the sign is reduced.

In still other instances, such as the manufacture of masking tapes which are used in painting operations which require high temperature baking, acrylate polymers are used as binding agents to bond the fibers of the tape together. If the acrylate polymers do not have adequate protection to prevent polymer degradation during such baking operations, the masking tape will lose its structural integrity so that it cannot be readily removed from the surface to which it was adhered.

It is known that antioxidants may be added to acrylic polymers. When these acrylic polymers are used alone, as in a cast film or molded article, the antioxidants appear to effectively retard degradation. However, when the same antioxidants are employed in nonwovens, including paper, wherein an acrylic polymer is used as a binder, only partial protection is achieved. Optimum antioxidant levels exist for nonwovens bound with acrylic polymer latices, above which, no further protection against degradation will be obtained, but which still fall short of the minimum protection required for many applications such as those mentioned above. The addtion of complexing or chelating agents to acrylate polymers do not protect the polymer against degradation. Moreover, when chelating agents are added to nonwovens saturated with acrylate polymer latices, the initial physical properties of the paper are reduced, the reduction becoming more marked as the amount of chelator is icreased.

SUMMARY OF THE INVENTION

I have now discovered quite unexpectedly that when an antioxidant and chelator are combined and added to a paper or other nonwoven material impregnated with an acrylate polymer latex the initial physical properties of the paper are retained after prolonged exposure to aging. This permits the use of acrylate saturated papers in applications such as advertising signs and masking tapes where prolonged exposure to weathering and/or high temperatures is required. An additional feature is the ability of papers and nonwoven materials protected in such a manner to withstand treatment with dry cleaning solvents such as perchloroethylene or methylethyl ketone. This latter feature enables the paper to be used for disposable garments and permits the dry cleaning of said disposable garments. Phenolic-type antioxidants are used in combination with polycarboxylic acid/amine-type chelating agents to obtain the improved aging characteristics described in this invention.

DETAILED DESCRIPTION

The acrylic polymer latices useful for the preparation of the nonwoven compositions of the present invention which have improved aging properties are obtained by the interpolymerization of from about 50 to 95% by weight based on the weight of the total monomers of an ester of an $\alpha,\beta$-monoolefinically unsaturated monocarboxylic acid or mixture thereof having the formula

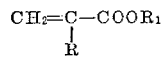

wherein R is a hydrogen or a methyl group and $R_1$ is an alkyl radical containing from 1 to 8 carbon atoms. Representative monomers of the foregoing type include methyl acrylate, ethyl acrylate, the propyl acrylates, the butyl acrylates, 2-methylhexyl acryl, 2-ethylhexyl acrylate, n-octyl acrylate, methyl methacrylate, ethyl methacrylate, octyl methacrylate, and the like.

In combination with the lower alkyl acrylate monomers one or more other $\alpha,\beta$-monoolefinically unsaturated monomers can be used. Such polymerizable comonomers may constitute up to as much as 49% by weight of the total monomers. Such polymerizable monomers include the conjugated dienes such as butadiene and isoprene; $\alpha$-olefins such as ethylene, propylene and isobutylene; vinyl halides such as vinyl fluoride, vinyl chloride, vinylidene chloride; vinyl esters such as vinyl acetate; vinyl aromatics such as styrene, $\alpha$-methyl styrene; vinyl toluene and vinyl naphthalene; alkyl vinyl ethers such as methyl vinyl ether, propyl vinyl ether, n-butyl vinyl ether, and isobutyl vinyl ether; $\alpha,\beta$-monoolefinically unsaturated carboxylic acids such as acrylic acid, methacrylic acid, ethacrylic acid, $\alpha$-chloro acrylic acid; acrylamide, methacrylamide and cyanoalkyl acrylates such as $\alpha$-cyanomethyl acrylate and the $\alpha,\beta$ and $\gamma$ cyanopropyl acrylates. It is especially advantageous in the preparation of useful acrylic latices for saturation of the papers of the present invention and to obtain improved aging properties, that an N-alkylol amide of an $\alpha,\beta$-monoolefinically unsaturated carboxylic acid be interpolymerized. The N-alkylol amides which can be employed include those having from about 4 to 10 carbon atoms such as N-methylol acrylamide, N-ethanol acrylamide, N-propanol acrylamide, N-methanol methacrylamide, N-ethanol methacrylamide, N-methylol maleimide, N-methylol maleimide, N-methylol maleamic acid, esters of N-methylol maleamic acid, N-methylol acids of the vinyl aromatic acids such as N-methylol paraffin benzamide and the like. The N-alkoxymethyl acrylamides, such as N-methoxymethyl acrylamide, N-butoxymethyl acrylamide or the corresponding methacrylamides can also be used. Preferred monomers are the N-alkylol amide type because of their ready availability and relatively low cost. These have the structural formula

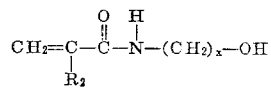

wherein $R_2$ is hydrogen or an alkyl group containing 1 to 4 carbon atoms and $x$ is a number from 1 to 4, and more preferably are N-methylol acrylamide, N-ethanol acrylamide and N-methylol methacrylamide. The amount of N-alkylol amide employed will range from about 0.1 to about 15% by weight and more preferably from about 0.2 to 7% by weight based on the total monomers employed. The alkylol amide monomers are an important aspect of the present invention since they provide reactive cure sites for the acrylic latices. These reactive cure sites enhance the physical properties of the acrylic polymers and therefore the physical properties of the nonwovens which are saturated with these acrylic polymers.

To obtain the acrylate polymers useful for the present invention, and more specifically the acrylic polymer latices, conventional polymerization techniques may be employed. In general, the polymerization will be conducted at a temperature of about 20 to 100° C. in the presence of a free radical generating catalyst. Free radical initiators which are useful include various peroxygen compounds such as the persulfates, benzoyl peroxide, t-butyl hydroperoxide, cumene hydroperoxide, t-butyl diperphthalate, 1-hydroxy cyclohexyl hydroperoxide, azo compounds such as azodiisobutyronitrile and dimethyl azodiisobutyrate and the like. Especially useful polymerization initiators are the water-soluble peroxygen compounds such as hydrogen peroxide and the sodium, potassium or ammonium persulfates. These water-soluble peroxygen compounds may be used by themselves or in an activated redox system. Typical redox systems include alkali metal persulfates with a reducing substance such as polyhydroxy phenol and an oxidizable sulfur compound such as sodium sulfite or sodium bisulfite, a reducing sugar, dimethyl aminopropionitrile, a diazomercapto compound, a ferricyanide compound, or the like. Heavy metal ions may also be employed to activate the persulfate catalyzed polymerization. Acrylic polymer latices having exceptional stability and low amounts of coagulum are obtained with alkali metal and ammonium persulfate initiated polymerizations. The amount of initiator used will generally range between about 0.1 to 3% by weight based on the monomers and preferably is maintained between about 0.15 and about 1% by weight. The initiator will generally be charged at the outset of the polymerization, however, incremental addition or proportioning of the initiator can be employed if desired.

When an emulsifier is used to prepare the acrylic polymer latices of this invention it will generally be an anionic or nonionic type emulsifier. Excellent results have been obtained when anionic emulsifiers are employed. Typical anionic emulsifiers which may be employed are the alkali metal or ammonium salts of the sulfates of an alcohol containing from 8 to 18 carbon atoms such as sodium lauryl sulfate; ethanolamine lauryl sulfate, ethylamine lauryl sulfate; alkali metal and ammonium salts of sulfonated petroleum or paraffin oils; sodium salts of aromatic sulfonic acids such as dodecane-1-sulfonic acid and octadiene-1-sulfonic acid; aralkylene sulfonates such as sodium isobutylbenzene sulfonate; alkali metal and ammonium salts of sulfonated dicarboxylic acid esters such as sodium dioctyl sulfosuccinate; alkali metal or ammonium salts of the free acids of complex organic mono- and diphosphate esters; and the like. When nonionic emulsifiers are used they may be of the general type such as octyl- or nonylphenol polyethoxyethanol and the like. Generally, if an emulsifier is used, the amount will range from about 0.01 to about 6% or more by weight of the monomers. The entire portion of the emulsifier may be added at the beginning of the polymerization or it may be added incrementally or by proportioning throughout the run.

The above latices may be used to impregnate a wide variety of nonwoven materials. They are most important, however, for use in nonwoven applications where the latex is applied to a paper substrate. The papers used may be obtained from bleached or nonbleached pulp; also by the unbleached sulfite, bleached sulfite, unbleached sulfate (kraft), semi-bleached and bleached sulfate processes. The latices may be applied to the papers by themselves or as customary in the production of paper garments, applied to paper which is bonded to a fabric scrim.

In addition to applications with paper products, the present invention is also useful for application to nonwoven materials which are derived from natural or synthetic fibers. Although the present invention gives its best results for the protection of paper materials which are saturated with acrylate latices, it is also useful to protect these other nonwoven materials saturated with acrylate polymer latices, since even with these latter fabrics the properties of the saturated material may decrease on aging as a consequence of the degradation of the acrylate polymer. Nonwoven materials derived from natural fibers such as cotton, wool, silk, and the like may be protected by the process of the present invention. Likewise, nonwoven materials derived from synthetic fibers such as rayon (viscose); cellulose esters such as cellulose triacetate; proteinaceous fibers such as those manufactured from casein; polyamides (nylons) such as those derived from the condensation of adipic acid and hexamethylene diamine or the self-condensation of caprylactam; polyesters such as polyethylene glycol terephthalate; olefin polymers such as polyethylene and polypropylene; acrylic fibers containing a minimum of about 85% acrylonitrile copolymerized with vinyl chloride, vinyl acetate, methacrylonitrile or the like, and the so-called modacrylic fibers containing smaller amounts of acrylonitrile; copolymers of vinyl chloride with vinyl acetate or vinylidene chloride; and the like.

The nonwoven material to be saturated with the acrylate polymers herein provided may be formed by using any of the conventional techniques, for example, for papers they can be formed by moving a fine wire screen from an aqueous suspension. When other fibers are used and made into nonwoven material, depending on the particular fiber or fiber blend being used and whether the fibers are to be randomly distributed or orientated, the fibrous web will be formed by carding, garnetting, deposition of the fibers from an air stream, deposition from solution, wet laying, or the like.

When papers saturated with acrylate polymers of the type described above were protected with the combination of antioxidant and chelator it was observed that higher initial physical properties of the papers were obtainable and the degree of retention of the physical properties upon aging were greater than obtained with the saturated papers identically saturated but protected by the chelator alone or the antioxidants alone. In addition, it was observed that the saturated papers protected with the antioxidant-chelator combination could withstand treatment with typical dry-cleaning solvents after being aged, with low losses of the acrylate polymer and good retention of physical properties. This same resistance to treatment with solvents was not observed with papers protected with either the antioxidant or chelator alone.

The antioxidants employed in the present invention in conjunction with the chelating agents are the phenolic-type antioxidants having one or more hydroxyl groups attached to an aromatic nucleus. Especially advantageous are the phenolic antioxidants wherein the hydroxyl group is hindered by the presence of one or more alkyl groups adjacent to it on the aromatic nucleus. The alkyl groups will generally contain from about 1 to 9 carbon atoms. Especially useful antioxidants are those wherein the alkyl group is a tertiary alkyl group containing from 4 to 9 carbon atoms. Useful antioxidants of the above types include:

p-phenyl phenol
p,p′-biphenol
2,6-di-tertiary-butyl-4-methyl phenol
t-butyl-m-cresol
2-phenyl-4-methoxy phenol
3,6-diisopropyl catechol
β-naphthol
1,5-naphthalene diol
1,1-methylene-bis-2-naphthol
2,2-methylene-bis(4-methyl-6-tertiary-butyl-phenol)
4,4-butylidene-bis(3-methyl-6-tertiary-butyl-phenol)
4,4′-thiobis(6-tertiary-butyl-m-cresol)
2,2′-methylenebis(5-isopropyl phenol)
2,6-bis(2′-hydroxy-3′-tertiary-butyl-methyl-benzyl)-4-methyl phenol
1,2,4-trimethyl-3,5,6-tri(3-methyl-5-isopropyl-4-hydroxybenzyl)benzene
1,2,5-triethyl-3,4,6-tri(3,5-diisopropyl-4-hydroxy-benzyl) benzene
1,2,4-tripropyl-3,5,6-tri(3-ethyl-5-tertiary-butyl-4-hydroxybenzyl)benzene
2-(3,5-di-tertiary-butyl-4-hydroxybenzyl)methyl phenol
2,6-di(3,5-diisopropyl-4-hydroxybenzyl)phenol
2-ethyl-4-(3,5-di-tertiary-amyl-4-hydroxybenzyl)phenol
4-(3-methyl-5-tertiary-hexyl-4-hydroxybenzyl)phenol
3,5-dimethyl-6-(3,5-diisopropyl-4-hydroxybenzyl) phenyl
2,4,6-tris(3,5-di-tertiary-butyl-4-hydroxybenzyl)phenol and the like. Also useful as antioxidants in the present invention will be phosphite esters wherein an aromatic ring compound is bonded to a phosphorous atom through an oxygen linkage. Such compounds include tritolyl phosphite, tri-p-octylphenyl phosphite, tri-p-nonylphenyl phosphite, tolyl o-phenylene phosphite, o-phenylene phosphite, aryl polyphosphites and monomeric phosphites from the reaction product of alkylated phenols and bisphenol-A types with phosphorous trichloride, and the like. Although not as effective as the phenolic-type antioxidants and the phosphite types, amine - type antioxidants such as the alkylated and aralkylated diphenyl amines, N-phenyl-1-naphthylamine, N-phenyl-2-naphthylamine, and the like may be employed if desired.

The polycarboxylic acid/amine-type chelating agents (complexing agents) used in combination with the phenolic-type antioxidants conform to the structural formula

wherein X and Y are alkali metal carboxylate groups of the formula

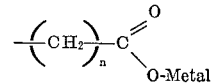

wherein $n$ is a number from 1 to 6, carboxylic acid groups of the formula

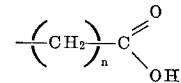

wherein $n$ is a number from 1 to 6, or one but not both may be a hydroxyalkyl group of the formula

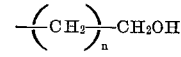

wherein $n$ is a number from 1 to 6; and Z is an alkali metal carboxylate or carboxylic acid grouping as described above, or a group conforming to the structure

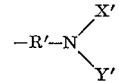

wherein R′ is a methylene grouping of the formula

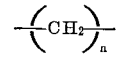

wherein $n$ is a number from 1 to 12, a cyclohexane or benzene ring, and X′ and Y′ are defined the same as for X and Y above and in addition one or the other, but not both, may be an alkyl radical containing from 1 to 20 carbon atoms or may conform to the structure

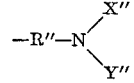

wherein R″ is defined the same as for R′ above and X″ and Y″ are defined the same as for X and Y above. Illustrative of the chelating agents fitting the above descriptions are: ethylenediamine tetraacetic acid, the sodium salt of ethylenediamine tetraacetic acid, nitrilotriacetic acid, sodium salt of cyclohexanediamine tetraacetic acid, pentasodium diethylenetriamine pentaacetate, trisodium hydroxyethyl ethylenediamine triacetate. Other chelating agents such as sodium hexahydroxy heptanoate, sodium gluconate, citric acid, dihydroxy ethyl glycine may also be employed if desired.

For the purposes of the present invention about 0.1 to about 3 parts by weight of antioxidant will be combined with about 0.2 to about 3 parts by weight of the chelating agent based on 100 parts by weight of the acrylate polymer. Best results are obtained when about 0.2 to about 1.2 parts by weight of the antioxidant are employed with about 0.5 to about 1.5 parts by weight of the chelating agent. The ratio of antioxidant to chelator will generally range between about 1:15 to about 15:1.

posure to the aging conditions. Prior to each weighing the papers were conditioned by heating for 3 minutes in 150° C. oven and then allowing the sample to come to equilibrium at room temperature for one hour. Physical properties were obtained on ½" x 8" strips of the paper in accordance with TAPPI Procedure T–404 using an Instron Tester having a pulling rate of 12 inches per minute. To determine the resistance of the papers to withstand treatment to solvents, such as may be encountered in a dry cleaning operation, both aged and unaged samples were also extracted for 16 hours with methyl ethyl ketone in a Soxhlet extractor and then tested to determine the effect of the extraction on the physical properties of the paper. This extraction technique also provides a convenient means for determining the amount of degradation of the polymer, since the percent polymer loss from the paper increases markedly as the polymer deterioration progresses.

TABLE I

| Latex | Aging (hrs.) | Percent polymer loss | | Percent residual polymer | Paper properties [1] | | | |
|---|---|---|---|---|---|---|---|---|
| | | After aging | After extraction | | Tensile (p.s.i.) | | Elongation (percent) | |
| | | | | | Dry | Wet | Dry | Wet |
| A | 0 | | | 100 | 57.0(100) | 36.4(100) | 11.8(100) | 18.7(100) |
| | 0 | | 7.5 | 92.5 | 52.5(92) | 34.4(14.5) | 11.2(95) | 17.5(94) |
| | 8 | 11.9 | | 88.1 | 32.0(56.0) | 13.0(35.7) | 5.0(42.5) | 6.3(34) |
| | 8 | 12.1 | 44.2 | 43.7 | 29.8(52.3) | 12.8(35.2) | 5.0(42.5) | 6.4(34) |
| B | 0 | | | 100 | 54.0(100) | 34.0(100) | 12.5(100) | 18.7(100) |
| | 0 | | 8.3 | 91.7 | 52.3(96.7) | 33.1(97.5) | 11.8(95) | 17.5(94) |
| | 8 | 8.8 | | 91.2 | 29.8(55.0) | 12.0(35.2) | 5.0(40) | 6.8(36) |
| | 8 | 9.9 | 60.0 | 30.1 | 27.5(50.9) | 12.2(35.8) | 4.4(35) | 6.3(34) |
| C | 0 | | | 100 | 57.3(100) | 36.6(100) | 12.5(100) | 18.1(100) |
| | 0 | | 8.1 | 91.9 | 55.5(97.0) | 34.8(103) | 11.3(95) | 18.1(100) |
| | 8 | 10.8 | | 89.2 | 36.0(67.7) | 17.4(51.8) | 6.3(50) | 8.8(48) |
| | 8 | 10.6 | 46.0 | 43.4 | 36.0(62.7) | 16.6(49.5) | 6.3(50) | 6.8(38) |
| D | 0 | | | 100 | 55.8(100) | 35.4(100) | 11.8(100) | 17.5(100) |
| | 0 | | 8.9 | 91.1 | 51.5(92.3) | 35.6(100) | 11.2(95) | 19.3(110) |
| | 8 | 8.3 | | 91.7 | 42.5(76.1) | 28.6(81) | 9.3(78) | 16.8(96) |
| | 8 | 6.9 | 33.6 | 59.5 | 43.7(78.4) | 26.4(75) | 8.2(70) | 16.8(96) |

[1] The percent properties retained are noted in parenthesis.

The following examples serve to illustrate the invention more fully, however, they are not intended to limit the scope thereof. Unless otherwise indicated all parts and percentages are given on a weight basis.

EXAMPLE I

An acrylate polymer latex suitable for saturation of papers and other nonwoven materials was prepared by emulsion polymerizing together 94 parts ethyl acrylate, 3 parts acrylonitrile, 1.2 parts acrylic acid and 1.8 parts N-methylolacrylamide. The resulting polymer latex contained 49.7% total solids. The latex was diluted to 20% total solids and compounded in accordance with the following recipes:

| | A | B | C | D |
|---|---|---|---|---|
| Latex (grams) | 40.3 | 40.3 | 40.3 | 40.3 |
| Water (mls) | 50.7 | 58.5 | 56.7 | 55.5 |
| 25% Soln. tri-p-nonylphenyl phosphite (mls.) | | 1.2 | | 1.2 |
| 10% soln. sodium hexahydroxy heptanoate (mls.) | | | 3.0 | 3.0 |

10 mil uncoated flat papers having a minimum fiber to fiber contact were saturated with each of the above latices by hand-dipping the papers into the latex. The saturated papers were then air-dried and cured for 3 minutes in a 150° C. air oven. The papers saturated with the above compounded latices (Latex A containing no protective agents; Latex B containing only antioxidant; Latex C containing only chelator; and Latex D containing an antioxidant and chelator combination) were aged and compared against unaged controls to demonstrate the improved aging characteristics of acrylate polymer saturated papers containing both a chelating agent and an antioxidant. Test results are set forth below in Table I.

Aging of the papers was conducted in a circulating air oven maintained at 165° C. To follow polymer loss on aging, the papers were weighed before and after ex- It is readily seen from the above table that the saturated papers protected with the p-nonylphenyl phosphite/sodium hexahydroxy heptanoate combination showed considerable improvement in their physical properties over the unprotected papers or those papers saturated with either the antioxidant alone or the chelator alone. A significant improvement of the percent polymer loss after extraction was also noted with Latex D as compared to the other latices. This improvement of the physical properties after aging of the papers saturated with acrylate latices due to the presence of a chelator/antioxidant combination is particularly significant since neither the antioxidant alone or the chelator alone is completely acceptable by itself to develop this degree of protection even when much higher levels of the chelating agent and antioxidant were individually employed. For example when higher levels of the antioxidant were used in an effort to obtain this same degree of protection, it was found that little or no improvement was observed when the phenolic-type antioxidant was present in amounts greater than about 2 parts per 100 parts of the acrylate polymer. An optimum level of protection is achieved somewhere below this value and no advantage is gained by adding antioxidant above this level. With the chelating agent the same effect was noted, that no advantage is gained by increasing the lever of the chelator, in fact the addition of larger amounts of chelator are detrimental to the saturated papers. When higher levels of chelating agent such as sodium hexahydroxy heptanoate and the sodium salt of ethylenediamine tetraacetic acid are used the initial physical properties of the acrylate saturated paper are markedly decreased to such an extent that the saturated paper is no longer acceptable for many applications.

EXAMPLES II–V

A series of acrylate polymers were prepared in latex form for use as binders for nonwoven materials. 10 mil flat uncoated papers were saturated with each of these polymer latices in accordance with the procedure described in Example I and tested accordingly to determine their resistance to aging in a 165° C. air-circulating oven. Control papers containing no protective agents, antioxidant alone and chelator alone were run to better demonstrate the enhanced physical properties of papers containing both a chelator and an antioxidant. Test results are tabulated in Table II.

carboxylic acid/amine-type chelating agent having the formula

wherein X and Y are selected from the group consisting

TABLE II

| | Acrylate polymer latex [1] | | Antioxidant | | Chelating agent | | Paper properties (after 8 hours aging) | | | |
|---|---|---|---|---|---|---|---|---|---|---|
| | | | | | | | Tensile (p.s.i.) | | Elongation (percent) | |
| Ex. | Type | Parts | Type | Parts | Type | Parts | Dry | Wet | Dry | Wet |
| II | 93 EA<br>3 VCN<br>2 Acmd<br>2 NMA | 100<br>98.5<br>97<br>95.5 | 50% emulsion of octylated diphenyl amine. | ------<br>0.75<br>------<br>0.75 | 10% soln. of sodium hexahydroxy heptanoate. | ------<br>------<br>3<br>3 | 33.5<br>36.5<br>48.5<br>49.6 | 16.2<br>18.4<br>28.0<br>30.4 | 5<br>7.5<br>7.5<br>8.8 | 7.5<br>7.5<br>10<br>12.5 |
| III | 69 EA<br>20 Sty<br>10 VCN<br>1 NMA | 100<br>98.5<br>97<br>95.5 | 25% soln. of 4,4' butylidene bis(6-tertiary-butyl phenol). | ------<br>1.5<br>------<br>1.5 | 10% soln. of trisodium hydroxyethyl ethylenediamine triacetate. | ------<br>------<br>3<br>3 | 46.5<br>44.0<br>49.5<br>57.1 | 15.8<br>17.6<br>22.2<br>27.6 | 6.3<br>5.0<br>7.5<br>10 | 5<br>7.5<br>7.5<br>11.2 |
| IV | 76 EA<br>20 Sty<br>3 VCN<br>1 NMA | 100<br>98.5<br>97<br>95.5 | 25% soln. of p-nonyl-phenyl phosphite. | ------<br>1.5<br>------<br>1.5 | 10% soln. of pentasodium diethylene diamine penta-acetate. | ------<br>------<br>3<br>3 | 39.5<br>35.0<br>50.0<br>59.5 | 16.8<br>18.0<br>28.2<br>34.6 | 5<br>5<br>7.5<br>8.8 | 10<br>8.8<br>13.7<br>17.5 |
| V | 85 nBwA<br>15 VCN | 100<br>98.5<br>97<br>95.5 | 25% soln. of 2,6-di-tertiary-butyl-4-methyl phenol. | ------<br>1.5<br>------<br>1.5 | 10% soln. of nitrilo triacetic acid. | ------<br>------<br>3<br>3 | 22.5<br>20.5<br>32.5<br>36.0 | 5.9<br>6.1<br>10.6<br>11.9 | 2.5<br>2.5<br>5<br>7.5 | 5<br>5<br>10<br>12.5 |

[1] Latex diluted to 20% total solids.
Abbreviations used in table: EA=ethyl acrylate; nBwA=n-butyl acrylate; VCN=acrylonitrile; Sty=styrene; Acmd=acrylamide; NMA=N-methylol acrylamide.

Results similar to those set forth in the above examples were obtained with 2-ethylhexyl acrylate polymer latices and with acrylate polymed latices having about 1 part acrylic acid interpolymerized. Also other phenolic-type antioxidants and other polycarboxylic acid/amine-type chelating agents, when used in combination were equally effective as those reported.

From the above examples the effect of the antioxidant/chelator combination is readily discernible. It is demonstrated that papers saturated with a wide variety of acrylate polymer latices are protected by using a combination of a phenolic-type antioxidant with a polycarboxylic acid/amine-type chelating agent. It is also shown that the papers protected with the antioxidant/chelator combination retain to a much greater extent their useful physical properties after prolonged aging and even treatment with solvents such as methylethyl ketone than the same papers which are protected with antioxidant alone or chelator alone.

I claim:
1. An article resistant to aging comprising a nonwoven material impregnated with (1) an acrylic interpolymer containing from about 50 to 95% by weight of an ester or mixture of esters of an $\alpha,\beta$-monoolefinically unsaturated monocarboxylic acid of the formula

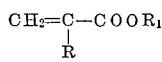

wherein R is hydrogen or a methyl group and $R_1$ is an alkyl radical containing from 1 to 8 carbon atoms, up to about 49% by weight one or more $\alpha,\beta$-monoolefinically unsaturated monomer and about 0.1 to 15% by weight of an N-alkylol amide of an $\alpha,\beta$-monoolefinically unsaturated carboxylic acid of the formula

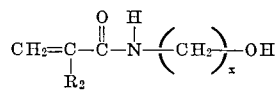

wherein $R_2$ is a hydrogen or an alkyl group containing from 1 to 4 carbon atoms and $x$ is a number from 1 to 4; (2) a phenolic type antioxidant having one or more hydroxyl groups attached to an aromatic nucleus and a hydroxyl group hindered by one or more adjacent alkyl groups having from 1 to 9 carbon atoms; and (3) a poly- carboxylic acid/amine-type chelating agent having the formula of an alkali metal carboxylate group of the formula

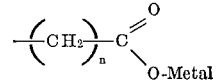

wherein $n$ is a number from 1 to 6, or a carboxylic acid group of the formula

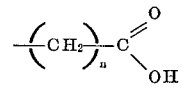

wherein $n$ is a number from 1 to 6, or one but not both may be a hydroxyalkyl group of the formula

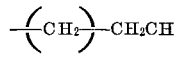

wherein $n$ is a number from 1 to 6; and Z is an alkali metal carboxylate or carboxylic acid group as defined for X and Y or a

group wherein R' is a methylene grouping of the formula

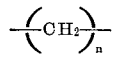

wherein $n$ is a number from 1 to 12, a cyclohexane or benzene ring, and X' and Y' are alkali metal carboxylate, carboxylic acid or hydroxyalkyl groups as defined for X and Y, and one but not both may be an alkyl group containing from 1 to 20 carbon atoms or a grouping which conforms to the structure

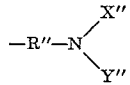

wherein R'', X'' and Y'' are defined as for R', X and Y above; said phenolic antioxidant present in an amount from about 0.2 to 3 parts by weight based on 100 parts by weight of the acrylic polymer and said chelating agent present in an amount from about 0.2 to 3 parts by weight based on 100 parts by weight of the acrylic polymer.

2. The article of claim 1, wherein the nonwoven material is paper.

3. The article of claim 1, wherein the nonwoven material is paper bonded onto a nylon, rayon or cotton scrim.

4. The article of claim 1, wherein the antioxidant and chelator are employed in a weight ratio from about 15:1 to about 1:15 and about 0.2 to 1.2 parts by weight of the antioxidant and about 0.2 to 1.5 parts of the chelating agent are employed per 100 parts by weight of the acrylic polymer.

5. An article of claim 4, wherein the $\alpha,\beta$-monoolefinically unsaturated monocarboxylic acid ester is ethyl acrylate.

6. An article of claim 4, wherein the $\alpha,\beta$-monoolefinically unsaturated N-alkylol amide is N-methylol acrylamide, N-ethanol acrylamide or N-methylol methacrylamide.

7. An articel of claim 4, wherein the $\alpha,\beta$-monoolefinically unsaturated comonomers are acrylonitrile, methacrylonitrile, acrylic acid, acrylamide or styrene.

References Cited

UNITED STATES PATENTS

| | | | |
|---|---|---|---|
| 2,668,294 | 2/1954 | Gilpin | 2—114 |
| 2,878,200 | 3/1959 | Holmes et al. | 260—45.85 X |
| 2,878,208 | 3/1959 | Holmes et al. | 260—45.88 X |
| 3,003,993 | 10/1961 | Wooten | 260—45.85 X |
| 3,157,562 | 11/1964 | Kine et al. | 260—29.6 X |
| 3,179,955 | 4/1965 | Wade | 2—243 |
| 3,231,533 | 1/1966 | Garrett et al. | 260—29.6 |
| 3,288,740 | 11/1966 | Meader et al. | 260—29.6 X |
| 3,355,418 | 11/1967 | Oldsberg | 260—45.7 |
| 3,361,695 | 1/1968 | Wilhelm et al. | 260—29.6 |
| 3,445,413 | 5/1969 | Jorgensen et al. | 260—45.7 X |

FOREIGN PATENTS

| | | |
|---|---|---|
| 576,289 | 5/1959 | Canada. |
| 623,971 | 7/1961 | Canada. |
| 707,832 | 4/1965 | Canada. |

WILLIAM D. MARTIN, Primary Examiner

M. R. LUSIGNAN, Assistant Examiner

U.S. Cl. X.R.

2—49, 243; 106—178, 186, 189; 117—140, 155, 161; 161—89; 260—29.6, 45.7, 45.85, 45.9, 45.95

PO-1050
(5/69)

UNITED STATES PATENT OFFICE
CERTIFICATE OF CORRECTION

Patent No. 3,539,434          Dated November 10, 1970

Inventor(s) David C. Spaulding

It is certified that error appears in the above-identified patent and that said Letters Patent are hereby corrected as shown below:

Column 10, line 45, Claim 1, the formula "$-(-CH_2-)-CH_2CH$" should read -- $-(-CH_2-)_n-CH_2OH$ --.

Column 11, line 10, Claim 5, after "acrylate" insert --, n-butyl acrylate or 2-ethylhexyl acrylate--.

Column 11, line 16, Claim 7, "articel" should read --article--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents